Dec. 8, 1959    T. M. A. LIPS ET AL    2,916,121
OVERLOAD CLUTCH
Filed Aug. 28, 1953    4 Sheets-Sheet 1
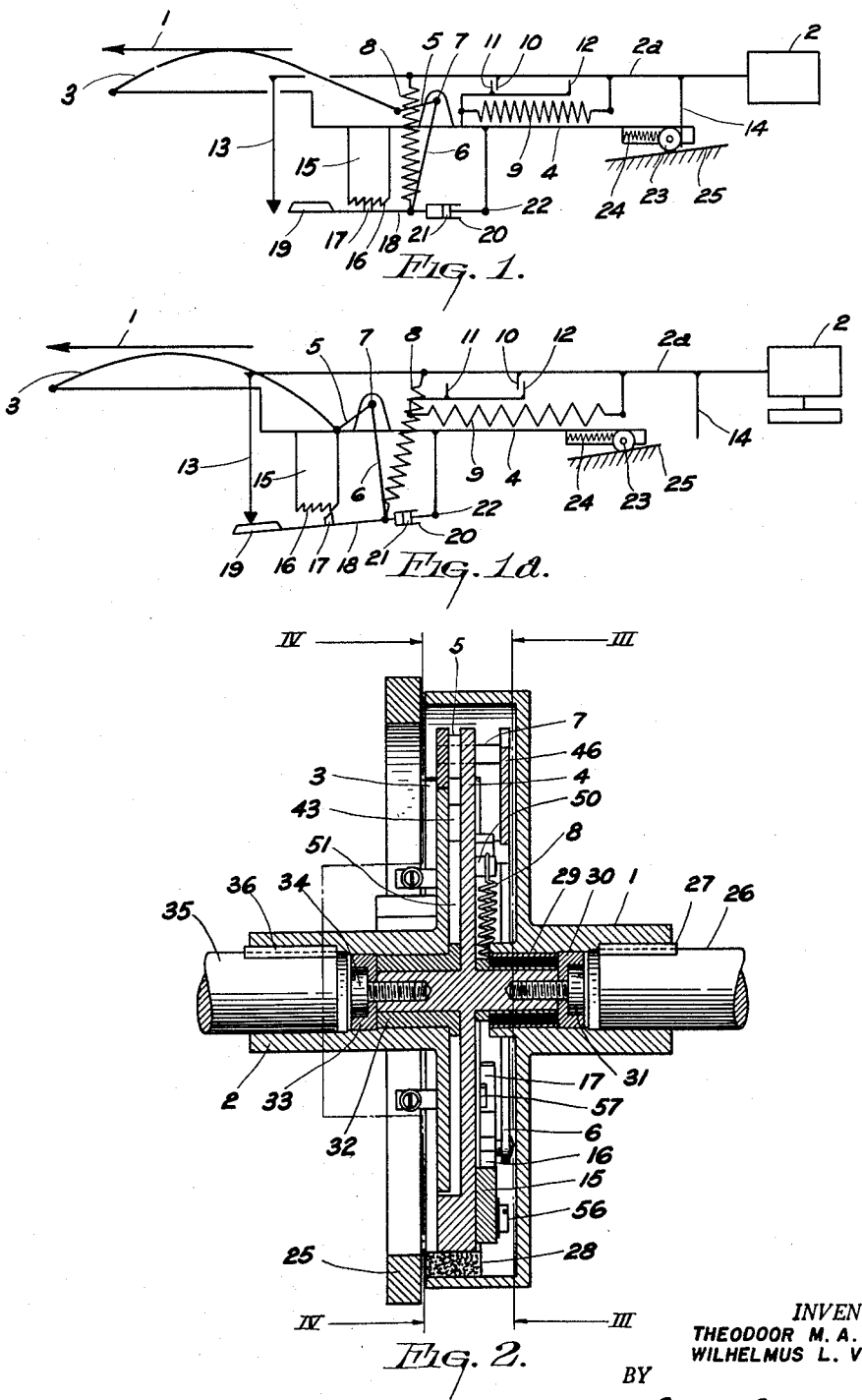
INVENTOR.
THEODOOR M. A. LIPS
WILHELMUS L. VERVEST
BY
AGENT.

Dec. 8, 1959  T. M. A. LIPS ET AL  2,916,121
OVERLOAD CLUTCH

Filed Aug. 28, 1953  4 Sheets-Sheet 2

INVENTOR.
THEODOOR M. A. LIPS
WILHELMUS L. VERVEST
BY
Fred M. Vogel
AGENT.

INVENTOR.
THEODOOR M. A. LIPS
WILHELMUS L. VERVEST
BY
Fred M. Vogel
AGENT.

INVENTOR.
THEODOOR M.A. LIPS
WILHELMUS L. VERVEST

2,916,121

OVERLOAD CLUTCH

Theodoor Maria Albert Lips and Wilhelmus Lambertus Vervest, Hilversum, Netherlands, assignors, by mesne assignments, to North American Philips Company, Inc., New York, N.Y., a corporation of Delaware Application August 28, 1953, Serial No. 377,152

4 Claims. (Cl. 192—56)

This invention relates to overload clutches and more particularly to overload clutches of the type which comprise a driving member, an auxiliary member and a driven member, the coupling of the driving member and the driven member being interrupted on the occurrence of a predetermined load of the driven member, and the coupling subsequently being re-established automatically when the said load decreases while the driven member upon interruption remains loaded with a force corresponding at least to the force transmitted prior to interruption to the driven member. The transmission of power from the driving member to the driven member occurs through the intermediary of the auxiliary member.

It has been proposed to couple the driving member and the auxiliary member by means of a pawl co-operating with a ratchet and, on the occurrence of overloads the pawl is lifted out of gear engagement due to displacement of the auxiliary member relative to the driving member. It has now been found that, after neutralization of the overload, clutching of the coupling involves difficulties in the case of comparatively high speeds and notably if the masses concerned are fairly considerable. Moreover, the said pawl construction is unsuitable for transmitting considerable power since the force required for releasing the pawl from the ratchet is rather considerable and the pawl would of necessity have to be of sturdy construction, since in the last analysis the whole power is transmitted by the pawl.

Applicant has found that a clutch of the aforesaid type permits the said difficulties to be overcome if, in accordance with the invention, the driving member is connected to the auxiliary member through a clutch which, on being thrown into operation, has a gradually increasing degree of coupling, and by providing separate means for throwing in the clutch gradually, preferably in an adjustable manner, the clutching and unclutching being brought about by displacement of the auxiliary member relative to the driven member on the occurrence of overloads.

As a rule, it will not be objectionable to disengage the clutch also gradually, but preferably the driving member and the auxiliary member are disconnected immediately on the occurrence of overloads.

The clutch according to the invention may be realized in several different ways. In one embodiment, the clutch between the driving member and the auxiliary member is a hydraulic coupling for example a so-called Fottinger or Vulcan coupling with which the quantity and/or pressure of the liquid are controlled. A clutch of this type has, in effect, a gradually increasing coupling degree and control of the quantity and/or pressure of the liquid permits the clutch to be thrown in gradually.

In a further embodiment of the invention, the driving member and the auxiliary member are coupled electrodynamically and the energization of either of the coupling parts is controlled. Such a coupling also permits of satisfying the requirements of a gradually increasing degree of coupling and a gradual engagement.

In one embodiment of the invention, however, the coupling between the driving member and the auxiliary member is preferably a friction clutch. As a rule, the use of a friction clutch as an overload clutch involves difficulties. It is known that the power which a friction clutch is able to transmit without slippage depends upon the particular condition of the friction faces, the temperature, the degree of humidity of the air and similar factors to such a degree that it is uncertain whether the clutch will completely disengage under all conditions and an exactly determined load. When using a friction clutch for coupling the driving member and the auxiliary member with an overload clutch of this type, the said difficulties are not experienced, since the disconnection is primarily determined by the relative displacement of the auxiliary member and the driven member, hence friction is not responsible for disconnection. There is no objection to making the friction between both clutching parts of the clutch according to the invention for example ten times as high as that required for transmitting the load at which the overload coupling is just not disengaged. On the occurrence of overloads the friction clutch is disengaged, hence it never disengages itself.

As an alternative, the friction clutch may, for example, be a disc-clutch. In one embodiment of the invention, however, the friction clutch preferably comprises one or more clutch bands, one end of which is secured to the auxiliary member and the other end of which is secured to a lever operating in a constrained manner, by the action of a spring. In either of its extreme positions, the spring is further stretched by the relative displacement of the auxiliary member and the driven member while provision is made of a blocking member preventing rocking of the lever as long as the spring has not been fully stretched which blocking member is likewise made inoperative by the relative displacement of the auxiliary member and the driven member. Due to interlocking of the several parts, the displacement of the lever by the spring, which displacement is prepared by the relative displacement of the auxiliary member and the driven member cannot occur before releasing the lever, the spring having been sufficiently stretched by then.

In one embodiment of the invention, a gradual motion is obtained by providing means for retarding the movement of the lever due to displacement of the spring. In a further embodiment of the invention said means may comprise a preferably adjustable hydraulic buffer which, in a further embodiment of the invention, causes the lever to move in a retarded manner only upon throwing in the clutch connecting the driving member to the auxiliary member.

In order that the invention may be readily carried into effect, it will now be described with reference to the accompanying drawings, given by way of example, in which—

Fig. 1 represents diagrammatically one form of a clutch according to the invention.

Fig. 1A is a diagrammatic view of the clutch of Fig. 1 in the uncoupled position.

Fig. 2 is a sectional view on the line II—II, viewed in the direction of the arrow shown in Fig. 3.

Figure 4:
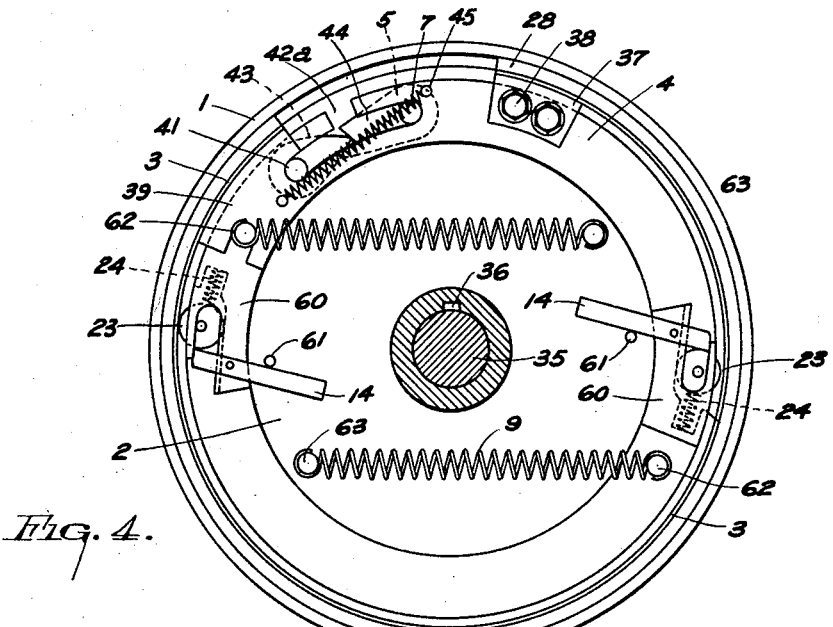
Fig. 4 is a view on the line IV—IV of Fig. 2 without recoil housing.
Figure 3:
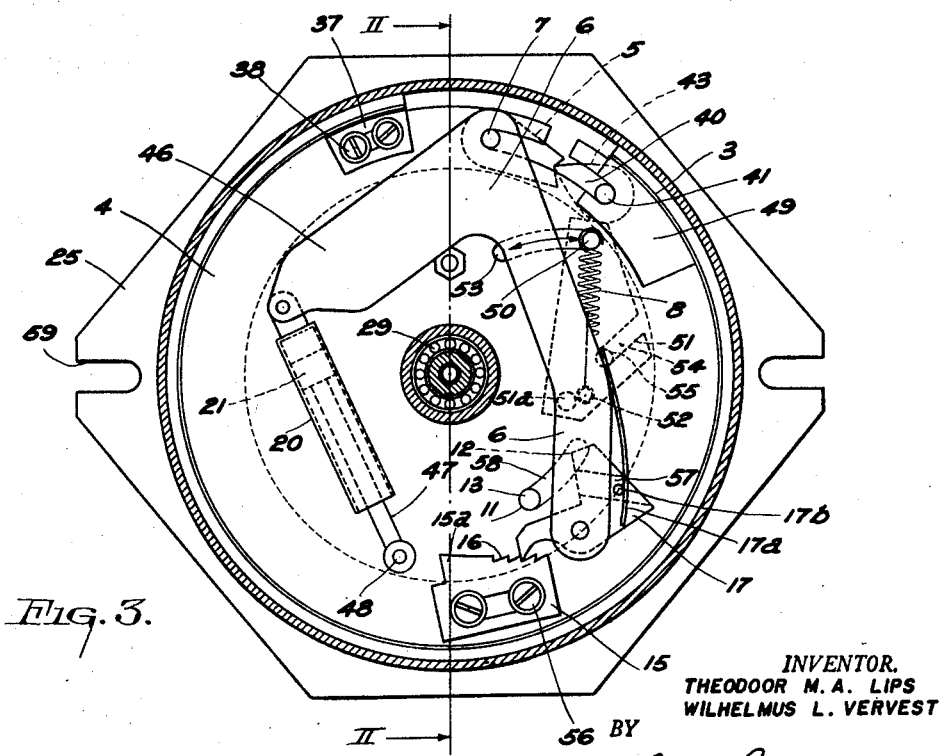
Fig. 3 is a view on the line III—III of Fig. 2, the driving member with clutch lining having been omitted.
Figure 3A:
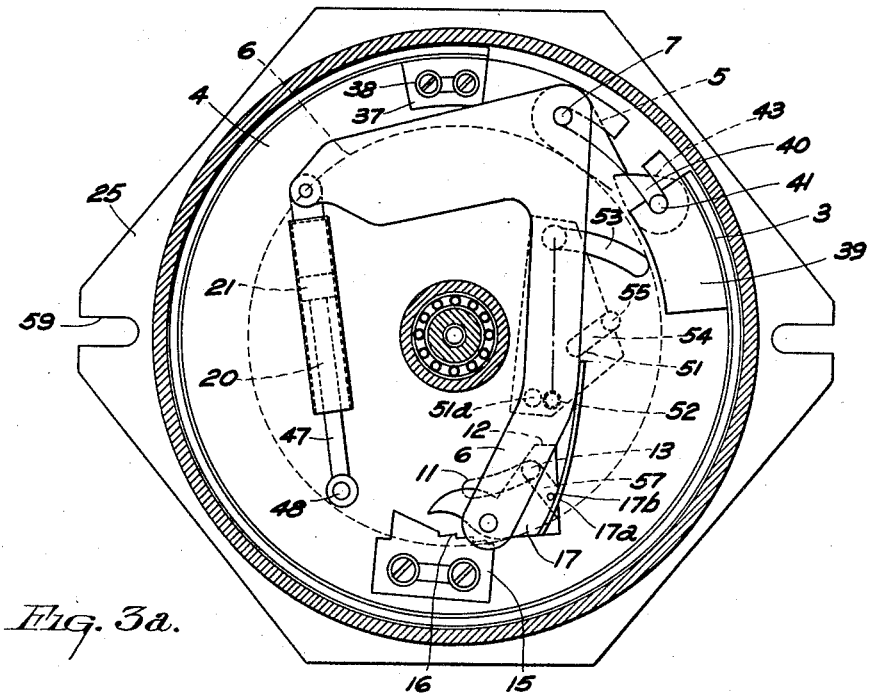
Fig. 3A is a view taken along the lines III—III of Fig. 2 with the clutch in an uncoupled position.
Figure 4A:
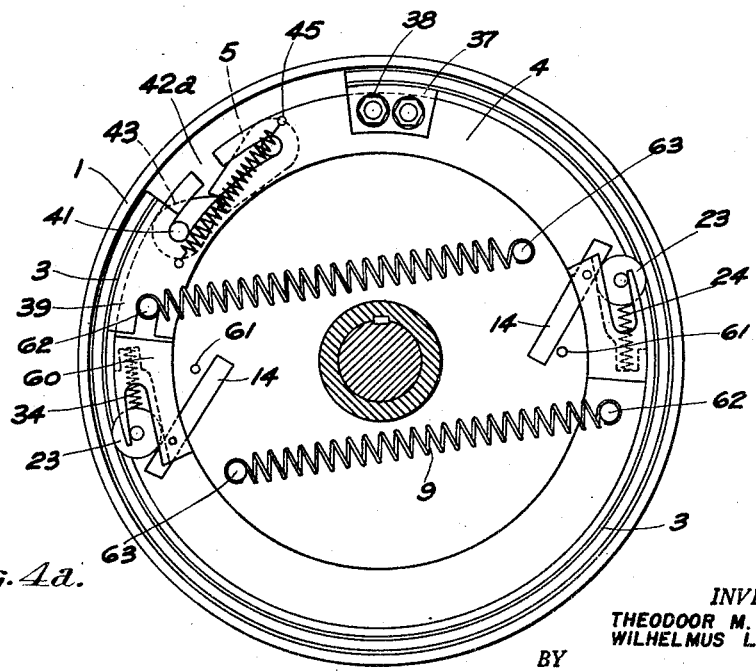
Fig. 4A is a view taken along the lines IV—IV of Fig. 2 with the clutch in the uncoupled position.
Figure 5:
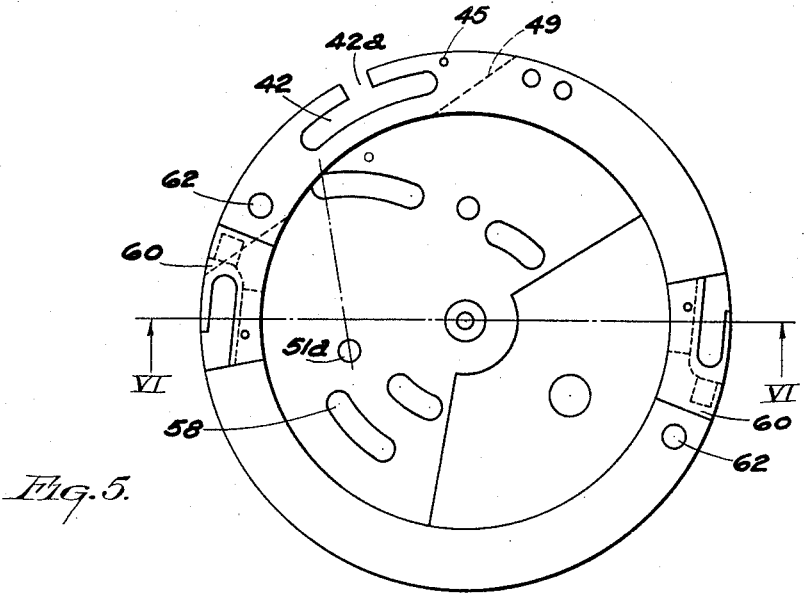
Fig. 5 shows the auxiliary member, viewed in the direction IV of Fig. 2.
Figure 6:
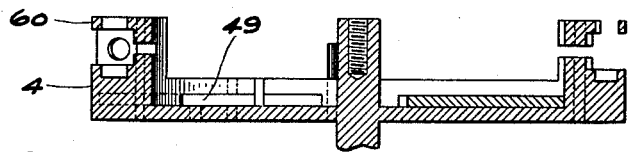
Fig. 6 is a section of the auxiliary member on the line VI—VI of Fig. 5.

Referring more particularly to the drawings and especially to Fig. 1 which shows diagrammatically one form of the overload clutch according to the invention in clutch engaging condition and Fig. 1A which discloses the clutch in an uncoupled position and, for the sake of simplicity, for coupling two members both having a rectilinear motion. However, it will be evident that the overload clutch may serve both for transmitting rectilinear motion and rotational motion. The reference numeral 1 denotes a driving member moving in the direction of the arrow, a driven member being denoted 2. A friction member 3, in the present case a clutch band is connected at one end to an auxiliary member 4 and at its other end to a lever 5 rigidly connected to a lever 6. The lever system 5, 6 will hereinafter be termed "toggle lever." This toggle lever 5, 6 is movable about a pivot 7 rigidly secured to the auxiliary member 4. Through a spring 8 the end of the lever 6 is connected to a rod 2a forming, in its turn, part of the driven member 2. Said rod 2a has further secured to it one end of a spring 9 whose other end is secured to the auxiliary member 4. The spring 9 further co-operates with a rod 10 which is movable between two stops 11 and 12 secured to the member 4 and limiting the stretching of the spring 9. The rod 2a is further associated with a rod 13 rigidly secured thereto, and a rod 14 being rigidly secured to the rod 2a.

The auxiliary member 4, to which the clutch band 3 is pivotally secured further comprises a blocking member 15 having a number of teeth 16. These teeth co-operate with a pawl 17 forming part of a rod 18 to which the end of spring 8 and the end of lever 6 are pivotally secured. The rod 18 further comprises a member 19 at one end and is secured at its other end to a cylinder 20 wherein a piston 21 is adapted to move. The piston 21 and the cylinder 20 together constitute a hydraulic buffer, the piston being pivotally secured to the auxiliary member 4 through a rod system 22. The auxiliary member 4 further carries a roller 23 acted upon by a spring 24. However, the roller 23 is prevented from moving to the right by the rod 14. The reference numeral 25 denotes a stationary part from which the roller 23 stands just free in clutched condition.

The operation of the overload coupling so far described and represented diagrammatically will first be explained with reference to Fig. 1. The driving member 1 carries along the clutch band 3 by friction so that the auxiliary member 4 is caused to follow. The auxiliary member 4 will stretch the spring 9 which is so proportioned as to carry along, in the absence of overloads, the rod 2a and consequently the driven member 2 without being appreciably stretched. Hence, no appreciable displacement occurs between the auxiliary member 4 and the rod 2a with driven member 2 during operation of the overload clutch. On the occurrence of overloads due to the driven member 2 experiencing a load exceeding that for which the clutch is intended, the spring 9 will be stretched, hence the position of the auxiliary member 4 changes with respect to that of the rod 2a with driven member 2, with the result that the point 7 will move to the left and the spring 8 will be stretched. If the over-load continues the stretching of the spring 9 and the displacement of the auxiliary member 4 relative to the rod 2a steadily increases, due to which the point 7 moves further to the left and ultimately reaches a point at the left of spring 8. By the action of spring 8 the toggle lever tends to tip to the right but this is prevented by the fact that the rod 18 is prevented from moving to the right by the blocking member 15 with teeth 16 and the pawl 17. Since, however, the rod 18 is rigidly secured to the auxiliary member, just as the assembly 15, 16 and 17, the last-mentioned parts together with the auxiliary member 4 have also moved to the left on the occurrence of overloads, so that the rod 13 engages the member 19. Owing to this member 19 is forced downwardly, the pawl 17 is jerked out of mesh with the teeth 16 and now the toggle lever 5, 6 promptly rocks about the point 7 by the action of the stretched spring 8, with the result that the clutch band 3 is released from the driving member 1 and the clutch is interrupted. Urged by the heavily stretched spring 9 the auxiliary member 4 and all parts secured thereto tend to move to the right to cause the toggle lever 5, 6 to tip causing disengagement of the clutch. This, however, is prevented by the roller 23 which, owing to the displacement of the auxiliary member to the left, has moved farther from the stationary part 25 but, by the action of spring 24, has been separately displaced to the right, thus causing the roller 23 to engage the stationary part 25. Upon neutralization of the overload of the driven member 2, the spring 9 will cause the rod 2a together with the spring 8 connected thereto to move to the left relatively to the auxiliary member 4. Due to this, the point at which the spring 8 is secured to the rod 2a is again moved to the left of the point 7 and the toggle lever 5, 6 will rock to the left. At the same time the clutch band 3 is pressed against the driving member 1, the rod 14 releasing the roller 23 from the stationary part 25 against the action of spring 24. Now the initial position has again been reached and the driven member 2 is again carried along by the driving member 1. The hydraulic buffer comprising the cylinder 20 and the piston 21 adapted to move therein provides that the toggle lever 5, 6 tips gradually. The hydraulic buffer may be constructed in a known manner such that only the tipping to the left and consequently engagement of the clutch occurs gradually while the clutch disengaging operation, i.e. the displacement of the part 6 to the right, is not retarded. The blocking member and its associated parts are so proportioned as to permit the rod 18 to move to the right as soon as the spring 8 has been stretched as much as possible, thus obtaining a so-called quick release.

It will be evident that the clutch engaging and the clutch disengaging operations of the overload coupling is solely determined, and must solely be determined, by the size of the spring 9, thus avoiding the difficulties inherent with the use of a friction coupling as an overload coupling, since the friction coupling between the driving member 1 and the auxiliary member 4 may readily be many times too strong for the load to be transmitted, the disconnection namely being constrained and fully independent of the type of coupling between the driving member 1 and the auxiliary member 4. Alternatively a type of coupling different from a friction coupling may be used between said two members, in the present case, for example, a hydraulic coupling or an electro-dynamic coupling may be used. When using a hydraulic coupling the relative displacement of the driven member and the auxiliary member may control the quantity and/or the pressure of the circulating liquid. In the case of an electro-dynamic coupling, said displacement may be caused to control either one of the coupling parts. In accordance with the invention, any coupling having a gradually increasing coupling degree upon engagement may generally be used.

Figure 7:
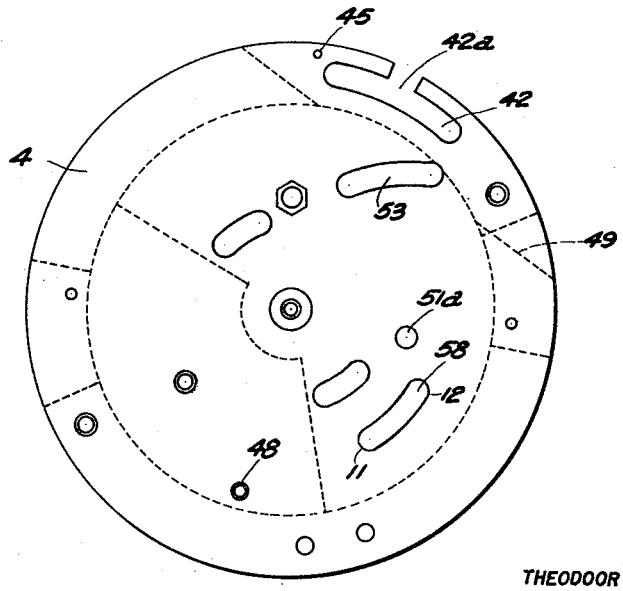
Fig. 7 shows the auxiliary member, viewed in the direction III of Fig. 2.

One form of an overload coupling according to the invention will now be described in detail with reference to Figs. 2 and 7, parts corresponding to those shown in Fig. 1 having the same reference numerals. The overload coupling described hereinafter is a rotational coupling. More particularly, a shaft 26 is connected through a key 27 to the driving member 1 comprising a clutch lining 28. The driving member 1 is journalled through a roller bearing 29 surrounding the auxiliary member 4. Said roller bearing is locked by a ring 30 held by a screw 31. The driven member 2 is seated through a bushing 32 on the auxiliary member 4, this bushing 32 being also held in place by means of a ring 33 with a screw 34. A shaft 35 is fitted in the driven member 2 by means of a key 36. The clutch band 3 pressed against the clutch lining 28 (all figures are shown with operative coupling) is secured at one end to the auxiliary member 4 through a U-shaped fastening member 37 and two screws 38, its other end being secured to a U-shaped sliding member 39, which is provided with a slot 40 in which a stud 41 fits. The auxiliary member 4 has a corresponding slot 42 which has an aperture 42a opening to the outside. Around the stud 41 is adapted to turn a lever 43 having a sharp point. The sliding member 39 is connected through a weak spring 44 to a pin 45 forming part of the auxiliary member. The longer arm 6 of the toggle lever 5, 6 turns about the stud 7 also provided in the slot 40. The longer arm 6 is rigidly secured to the shorter arm 5 having a V-shaped end accommodating the pointed end of the lever 43. The longer arm 6 of the toggle lever 5, 6 is provided with a projection 46 to which is secured the cylinder 20 of a hydraulic buffer 20, 21. The piston 21 of this buffer is pivotally connected through a connecting rod 47 to a point 48 of the auxiliary member 4. Both levers 5 and 43 engage a slot 49 provided in the body of the auxiliary member 4. The aperture 42a between the slot 42 and the periphery of the auxiliary member permits the studs 7 and 41 to be insertable therein. The spring 8, whose displacement causes the lever 5, 6 to tip, is secured at one end through a pin 50 to a tipping member 51 and at its other end to a pin 52 secured to the arm 6 of the toggle lever. Since the pin 50 is to be passed through the auxiliary member, the latter is provided with a slot 53 in which the pin 50 is movable. The tipping member 51 moving about a pin 51a is provided with a slot 54 in which is movable a pin 55 secured to the driven member.

The blocking member 15 with teeth 16 is secured to the auxiliary member 4 by means of two screws 56. The lower end of the lever 6 carries a pawl member 17 which is pivotally secured to the lever 6 and has a slot 57. A plate spring 17a secured to the arm 6 and resting on a pin 17b forming part of the pawl member 17 provides that the pawl 17 always occupies the correct position. When the auxiliary member 4 moves relatively to the driven member 2, a pin 13 secured to the driven part 2 and passing through a slot 58 of the auxiliary member will move the pawl 17 to release the latter from the blocking member 15. Since the lever 6 has also been tipped, the pin 13 finally finds its way into the slot 57.

The stops 11 and 12 are formed by two slots 11 to 12 of the auxiliary member, in which slots a pin 10 forming part of the driven member is movable. The stationary part 25 forms part of the recoil housing 25 which is truly centered relatively to the coupling, for example to a fixed base by means of bolts in the two clearance holes 59. The auxiliary member 4 comprises two symmetrically located projections 60 accommodating rollers 23. These rollers are acted upon by springs 24 but are forced inwardly, against the force or springs 24, by levers 14 which are held by studs 61 forming part of the driven member 2. As soon as the studs 61 move relatively to the auxiliary member, that is to say on the occurrence of overloads, the levers 14 are released and under the influence of springs 24 the rollers 23 receive a slight tangential outward movement and engage the inner wall of the recoil housing or stationary part 25. Main springs 9, one end of which is secured to the auxiliary member 4 by means of studs 62 forming part of the latter and the other end of which is secured to pins 63 forming part of the driven member 2.

The construction and operation of the example described above fundamentally corresponds to the example diagrammatically shown in Fig. 1, hence reference is made to the description of this figure for explaining its operation. The principal difference, between the two constructions, however not of vital importance, is that the spring 8 in Fig. 1 is secured directly to the driven member 2 through the rod 2a, whereas in Figs. 2 to 7 the spring 8 is secured to the stud 50 forming part of the tipping member 51 which tips in a constrained manner about the point 51 upon actuation by the pin 55 movable in the slot 54. Thus, instead of the relative displacement of the auxiliary member 4 and the driven member 2 with rod 2a stretching the spring 8 immediately and causing it to move, this is effected in the present case by the pin 55 secured to the driven member 2 and causing the member 51 to tip when it moves in the slot 54. This results in that the pin 50, which is rigidly secured to the member 51 and has secured to it the spring 8, to move in the slot 53 in order to cause the spring 8 to change its position.

Another unessential difference is to be seen in the construction of the two members 5 and 43. The arm 5 is not secured directly to the clutch band 3 but, upon rotation, engages the lever 43 which finally stretches the clutch band. In the disengaged condition of the clutch, the spring 44 draws the clutch band as far as possible from the clutch lining to prevent it from sliding. The blocking member 15 comprises a tooth-shaped piece 15a behind which the pawl 17 engages in the disengaged condition of the coupling.

In the example described, the tipping of the toggle lever 5, 6 urges a clutch against a clutch lining and on the occurrence of overloads the clutch band is released from the lining. It will be evident that said movement of the toggle lever may alternatively serve to control, for example, the quantity and/or the pressure of the liquid in a hydraulic coupling. This may, for example, occur electrically by causing the toggle lever to make and break contacts. In this instance, the hydraulic coupling is substituted for the friction coupling and it will then be adequate to incorporate the hydraulic coupling as a separate unit and not jointly with the overload coupling in a single housing. The same holds true when using an electro-magnetic coupling, in which the toggle lever 5, 6 regulates the energization of either part.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. An overload clutch comprising a driving member, an auxiliary member and a driven member, a coupling arrangement operatively connecting said driven member to said driving member through said auxiliary member until the occurrence of a predetermined overload which interrupts said coupling, said coupling arrangement including a friction coupling between said driving member and auxiliary member and a resilient coupling between said auxiliary member and driven member, said coupling being automatically re-established when said load decreases to a normal load, an hydraulic buffer mechanism operatively connected to said auxiliary member whereby the clutch engagement is caused to occur gradually thereby progressively increasing the degree of coupling between said driving member and said driven member upon engagement of said clutch, and means for quickly releasing the engagement of said clutch during the occurrence of an overload by the displacement of said auxiliary member relative to said driven member.

2. An overload clutch comprising a driving member, an auxiliary member and a driven member, said driving member being operatively coupled through said auxiliary member to said driven member until the occurrence of a predetermined overload which interrupts said coupling, said coupling including a friction coupling between said driving member and said auxiliary member and a spring connected at one end to said auxiliary member and at the other end to said driven member, said coupling being automatically re-established when said load decreases to a normal load, an hydraulic buffer mechanism operatively connected to said auxiliary member whereby the clutch engagement is caused to occur gradually thereby progressively increasing the degree of coupling between said driving member and said driven member upon the engagementi of said clutch, the disengagement of said clutch being brought about rapidly during the occurrence of an overload by the displacement of said auxiliary member relative to said driven member, said coupling between said driving member and said auxiliary member being a friction coupling which comprises at least one clutch band; a lever pivotally mounted on said auxiliary member, said clutch band being fixed at one end to said auxiliary member and at the other end to said lever, said spring when stretched by the relative displacement of said auxiliary member and said driven member causing rocking of said lever to thereby disengage said friction coupling, and a blocking member preventing rocking of said lever as long as said spring has not been fully stretched, said blocking member being rendered inoperative by the relative displacement of said auxiliary member and said driven member.

3. An overload clutch comprising a driving member, an auxiliary member and a driven member, said driving member being operatively coupled through said auxiliary member to said driven member until the occurrence of a predetermined overload which interrupts said coupling, said coupling including a friction coupling between said driving member and said auxiliary member and a spring connected at one end to said auxiliary member and at the other end to said driven member, said coupling being automatically re-established when said load decreases to a normal load, an hydraulic buffer mechanism operatively connected to said auxiliary member whereby the clutch engagement is caused to occur gradually thereby progressively increasing the degree of coupling between said driving member and said driven member upon engagement of said clutch, the rapid disengagement of said clutch being brought about during the occurrence of an overload by the displacement of said auxiliary member relative to said driven member, said coupling between said driving member and said auxiliary member being a friction coupling which comprises at least one clutch band; a lever pivotally mounted on said auxiliary member, said clutch band being fixed at one end to said auxiliary member and at the other end to said lever, said spring when stretched by the relative displacement of said auxiliary member and said driven member causing rocking of said lever to thereby disengage said friction coupling, a blocking member preventing rocking of said lever as long as said spring has not been fully stretched, said blocking member being rendered inoperative by the relative displacement of said auxiliary member and said driven member, and said hydraulic buffer mechanism also retarding the movement of said lever due to the displacement of said spring.

4. An overload clutch as claimed in claim 3 wherein said movement of said lever occurs in a retarded manner upon the engagement of the clutch connecting said driving member to said auxiliary member.

References Cited in the file of this patent

UNITED STATES PATENTS

| | | |
|---|---|---|
| 2,376,925 | Lavin | May 29, 1945 |
| 2,406,142 | Gebert | Aug. 20, 1946 |
| 2,425,736 | Hall | Aug. 19, 1947 |
| 2,431,107 | Brown | Nov. 18, 1947 |
| 2,570,585 | Murphy | Oct. 9, 1951 |